United States Patent [19]

Larkin

[11] 4,090,042
[45] * May 16, 1978

[54] ACOUSTICAL COMMUNICATIONS HEADSET

[75] Inventor: Wallace Keith Larkin, Soquel, Calif.

[73] Assignee: Kayce, Inc., Aptos, Calif.

[*] Notice: The portion of the term of this patent subsequent to Nov. 23, 1993, has been disclaimed.

[21] Appl. No.: 667,989

[22] Filed: Mar. 18, 1976

Related U.S. Application Data

[63] Continuation-in-part of Ser. No. 561,473, Mar. 24, 1975, Pat. No. 3,993,879.

[51] Int. Cl.² ................................................ H04M 1/05
[52] U.S. Cl. .......................... 179/156 A; 179/182 R; 181/20
[58] Field of Search ............. 179/1 ST, 182 R, 1 VE; 181/1 V, 20

[56] References Cited

U.S. PATENT DOCUMENTS

| 278,411 | 5/1883 | Dickson | 181/18 |
| 2,755,336 | 7/1956 | Zener et al. | 179/1 ST |
| 3,450,839 | 6/1969 | Scanlon | 179/1 VE |
| 3,693,748 | 9/1972 | Jones et al. | 181/20 |
| 3,851,123 | 11/1974 | Lipinski et al. | 179/182 R |

FOREIGN PATENT DOCUMENTS

| 427,939 | 6/1911 | France | 181/18 |
| 548,228 | 9/1956 | Italy | 181/18 |

Primary Examiner—William C. Cooper
Attorney, Agent, or Firm—Limbach, Limbach & Sutton

[57] ABSTRACT

The detachable communications headset described herein is all acoustic, comprising support means for a transmitter tube and a receiver tube and for supporting the headset on the user's head. The transmitter and receiver tubes are detachably coupled to communications equipment remote from the headset. All electronic components necessary for radio and telephone communications are remote from the user's head.

11 Claims, 6 Drawing Figures

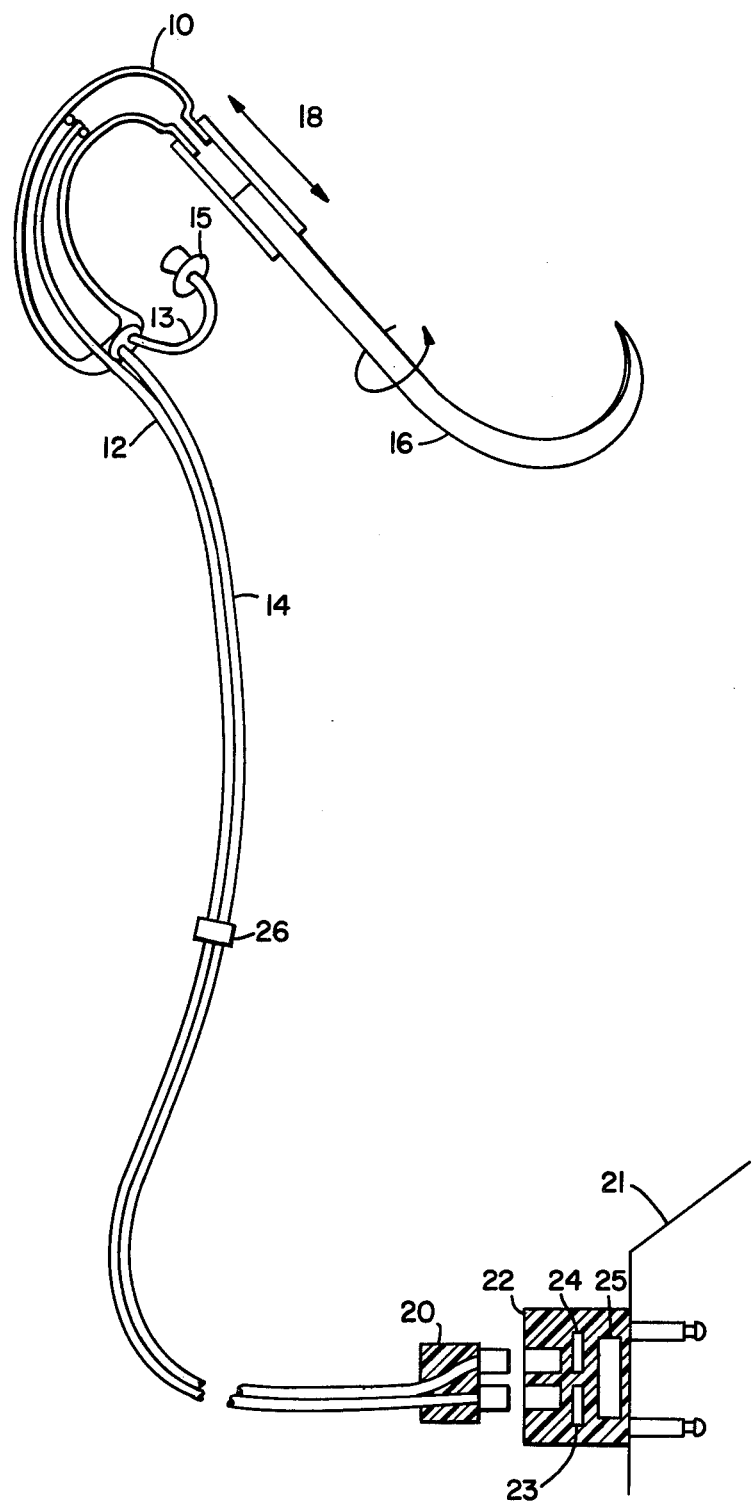
FIG _ 1

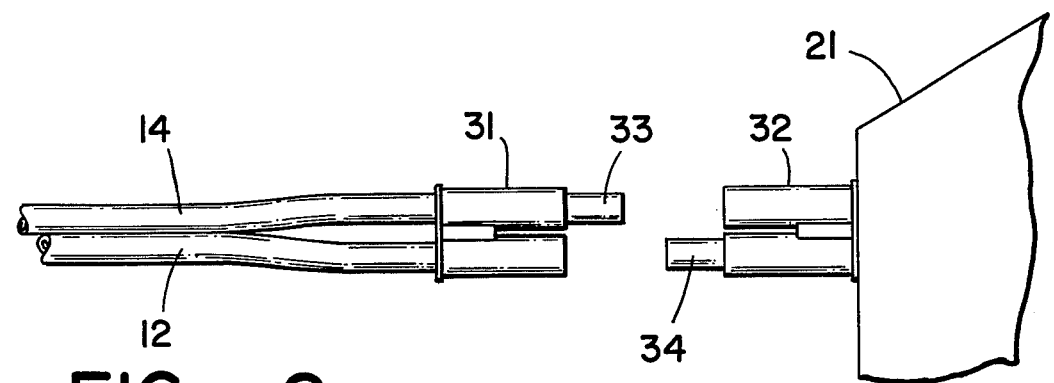
FIG _ 2
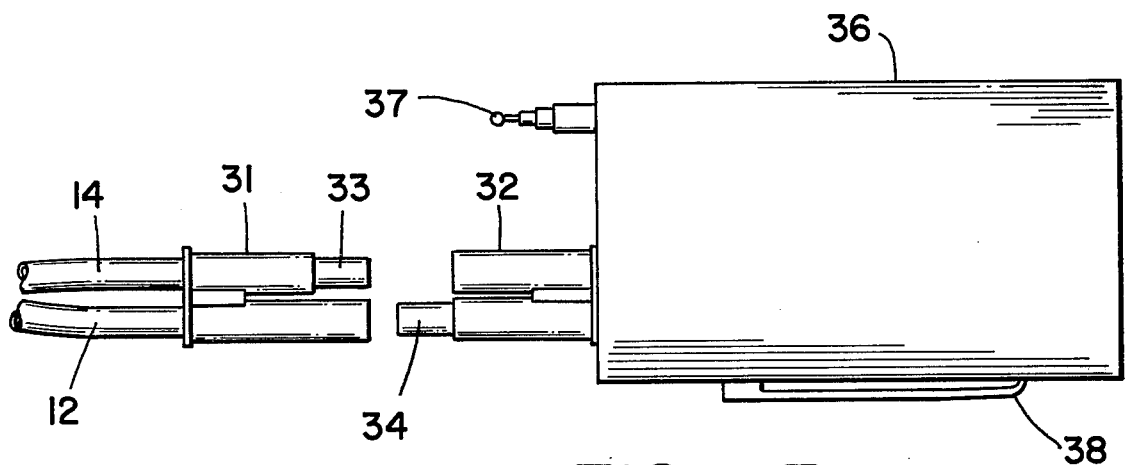
FIG _ 3
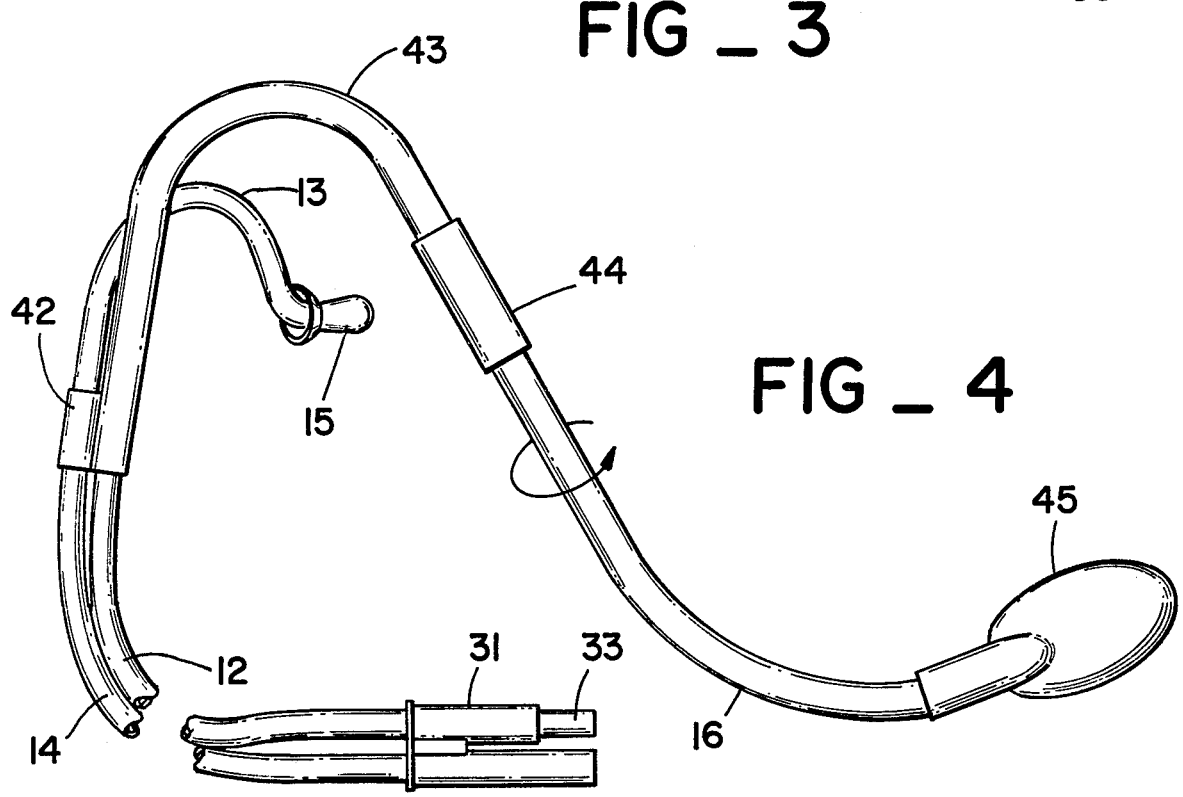
FIG _ 4

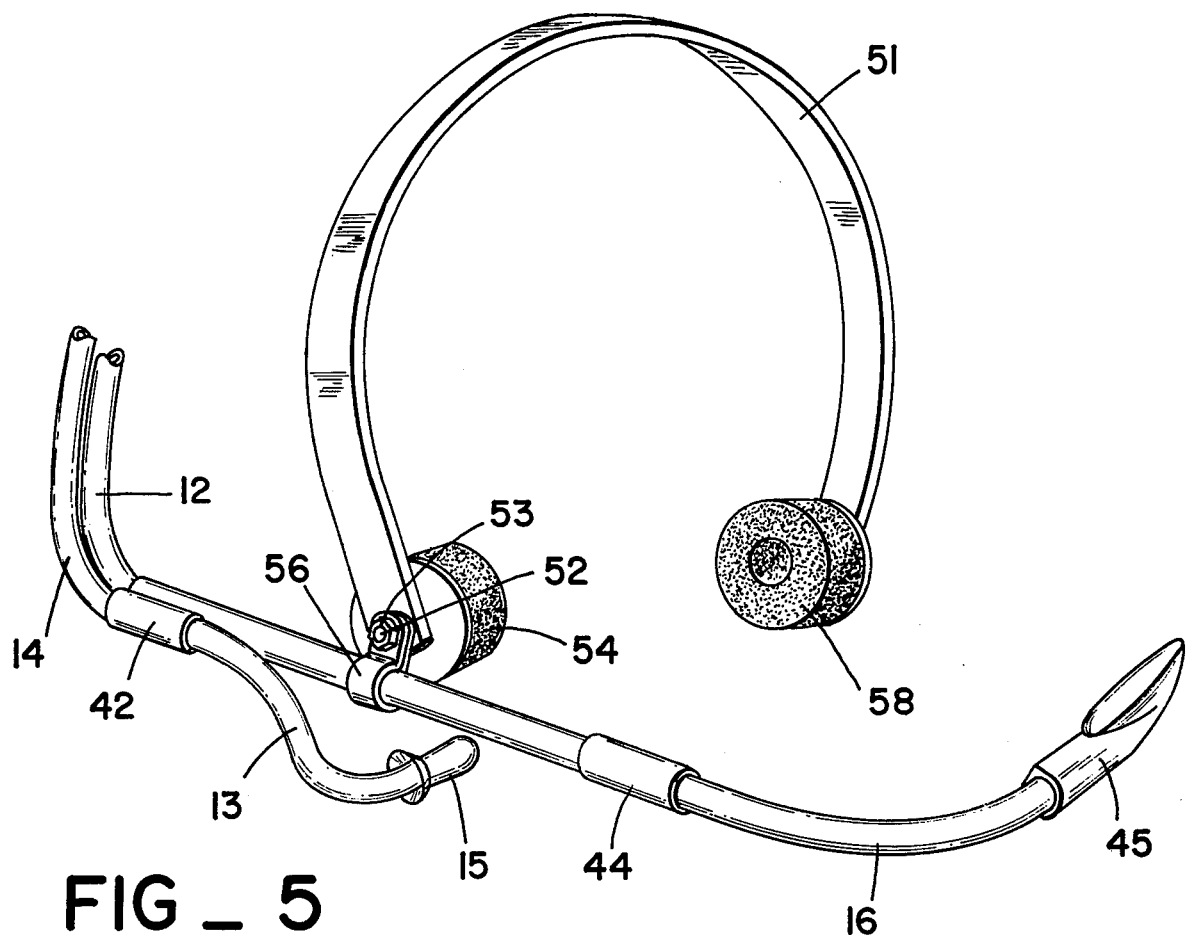
FIG_5
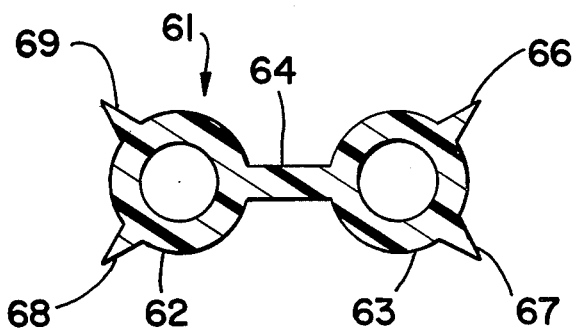
FIG_6

ACOUSTICAL COMMUNICATIONS HEADSET

This application is a continuation-in-part of application Ser. No. 561,473, filed Mar. 24, 1975 now U.S. Pat. No. 3,993,879.

BACKGROUND OF THE INVENTION

Prior art radio and telephone communication headsets typically incorporate a microphone and receiver which require amplifier or other appropriate electronic impedance matching circuits for interface with a console, or at least electrically conductive wires to similar electronic circuitry located in the console. These devices have been substantially miniaturized in recent years, one such device being described in U.S. Pat. No. 3,184,556 entitled "Miniature Headset-Microphone Adapted for Use with a Mask", issued May 18, 1965 to the inventor hereof. Another example is described in U.S. Pat. No. 3,781,492 which relates to miniaturized headsets. However, even as miniaturization has improved user comfort by reducing weight, initial cost is high. Owing to the relative fragility of their component parts, ruggedized construction is required, which also adds to cost, and replacement or repair of these headsets is frequent and expensive. Stability and comfort have remained factors for improvement, as size and configuration of conventional headsets are determined by the dimensions of integrally mounted electronic components. In addition, the electrically conductive wires create a hazard to the user in that those wires can conduct high voltage transients, often present in and around communication systems, to the user's head.

It has been known to provide voice tubes attached to electrical sound transmitters to permit acoustic transmitting and receiving from electrical equipment nearby. Examples are U.S. Pat. Nos. 1,541,121 and 1,615,974 but these devices are not head-mounted actoustical systems for detachable coupling to communication equipment for regular use in replacing the miniaturized headsets.

SUMMARY OF THE INVENTION

The present invention relates to an all-acoustic miniature headset which completely removes all electrical components from the head of the user. It consists of a transmitter tube and a receiver tube mounted on support means which is attached to the head of the user. The support means can be mounted on the ear, preferably behind, as in conventional miniaturized headsets, or it can be mounted on a headband or the temple of eyeglasses. The receiver tube has an ear piece which is either integral with the receiver tube or coupled to it. The other end of the receiver tube has a coupling for attachment to other communications equipment.

The transmitter tube includes a mouthpiece, which may be an integral part of the transmitter tube or coupled to it. The other end of the transmitter tube has a coupling for attachment to other communications equipment. The other communications equipment can be a headset of the same type coupled to receive sound from the transmitter tube of the first headset, whereby two users can communicate through an all-acoustic intercom system. Alternatively, the other communication equipment can be a miniaturized transmitter and receiver with a clip for attachment to the belt or other location on the body of the user. Another alternative is to couple the acoustic headset to a console having appropriate transmitting and receiving electronics. In the preferred embodiment, the headset attaches to a jack having a microphone and a receiver transducer in a jack which is plugged into a console, with the acoustic transmitter and receiver tubes detachably connected to the jack. This permits repair of the headset electronics separately from the headset or the console.

The all-acoustic headset of this invention is entirely passive, and includes no electronic components. It is, therefore, inherently insensitive to harsh use and shock. Moreover, if the headset is damaged or lost, it may be replaced at low cost. The safety of the acoustic headset is substantially improved because there is no possibility of shock or other harm resulting from the proximity of electrical wires and components to the head of the user, as in existing headsets. It is lighter than any prior miniature headset.

DESCRIPTION OF THE DRAWING

FIG. 1 shows a headset constructed according to the present invention and includes a cross-sectional view of the support means mounted behind the ear.

FIG. 2 is an illustration of an electronics communications console adapted to receive the all-acoustic headset of the present invention.

FIG. 3 is an illustration of a transmitter and receiver electronics package adapted to receive the coupling of the acoustic headset.

FIG. 4 illustrates a simpler version of the head-mounted acoustic device adaptable to be coupled to other communication equipment.

FIG. 5 is an illustration of a headset supported by a head-band.

FIG. 6 is a cross-sectional view of an alternative embodiment of transmitting and receiving tubes separated to avoid interference.

DESCRIPTION OF THE PREFERRED EMBODIMENT

Referring to FIG. 1 of the drawing, one preferred embodiment of the present invention comprises hollow post auricle mount 10 coupled to transmitter, ear and receiver tubes 12, 13 and 14, respectively, by compression fit or other suitable means and to mouthpiece tube 16 via hollow adjustment means 18. Adjustment means 18 may be constructed of any essentially inflexible material such as hard plastic or aluminum. Transmitter tube 12, ear tube 13 and receiver tube 14 are of a suitable flexible material, such as polyvinylchloride (PVC), but may be of any other acoustically similar material. All of these tubes in the embodiment shown are approximately ¼ OD and ⅛ ID. For purposes of the present invention, the tubes may be of greater or lesser diameter, down to a minimum of 50 mils for suitable acoustic transmission. Ear tube 13 terminates in the user's ear via earpiece 15 which is constructed of a softly pliable material for maximum user comfort such as PVC. Both receiver and transmitter tubes are long enough to terminate at plug 20 (up to approximately 8 feet) which connects to communications console 21 through detachable jack 22 containing necessary electronic components such as microphone 23, receiver 24 and amplifier 25. Jack 22 is a molded plastic case designed to fit female receptacles generally used on conventional telephone and radio communications equipment for headset attachment.

FIG. 2 shows an alternative approach to coupling the acoustic headset to console 21. Transmitter tube 12 and receiver tube 14 extend from the acoustic headset (not shown) in the same manner as in FIG. 1. The tubes terminate in a coupling 31 which consists of two hollow tubes made of, suitably, rigid plastic. Coupling 31 has an extension 33 of reduced diameter adapted to mate with a corresponding tube of larger diameter in an opposite coupling. On the console 21 is an identical coupling 32 which also consists of two hollow tubes, one of which has a hollow extension 34. Coupling 31 slidably engages coupling 32 with the extensions 33 and 34 of reduced diameter entering the hollow tubes of larger diameter in the opposite coupling. In this manner, all of the electronic components are contained within the console 21 and only the acoustic members are detachable from the console. The embodiment of FIG. 2 eliminates jack 22 from the system. The only part exposed for damage, loss or theft is the inexpensive, essentially indestructible, all-acoustic headset and associated tubes.

Console 21 can be any desired electronics communication console, such as conventional telephone equipment or radio equipment into which headsets are traditionally plugged. The radio equipment may also conveniently be citizens band radio mounted on vehicles, such as trucks or motorcycles. In the case of a motorcycle, the console 21 can be securely mounted at an appropriate location on the motorcycle and the acoustic headset taken with the user when the motorcycle is left.

FIG. 3 shows another variation on the apparatus shown in FIG. 2. Instead of an electronic console 21, shown in FIG. 2, there is illustrated a miniaturized transmitter-receiver 36. Transmitter-receiver 36 contains the same elements as the console 21 in FIG. 2, but the size is reduced to fit a pocket. At a suitable location on the transmitter-receiver is a coupling 32 adapted to mate with coupling 31 as previously described. Transmitter-receiver 36 also has an antenna 37 which is illustrated as telescopic. Antenna 37 may take any other convenient configuration, such as suitable wires attached to fixed antennae located remote from the transmitter-receiver 36. Clip 38 is attached to the portable transmitter-receiver so that it may be affixed to the belt of a user, to a pocket or to some other convenient location on the user's wearing apparel.

FIG. 4 illustrates a variation of the headset shown in FIG. 1. FIG. 1 illustrates a post auricle mount 10 which provides balance and stability for the headset. However, in those instances where such balance and stability are not necessary, as where the headset fits the wearer of a helmet, a simpler construction is possible, as illustrated in FIG. 4. FIG. 4 shows a device which resembles the device of FIG. 1 in that transmitter tube 12 is connected to a mouthpiece tube 16 and receiver tube 14 fits ear tube 13 bearing an ear plug 15. However, instead of having a mount through which sound passes, the device of FIG. 4 simply has a sleeve 42 which is secured to receiver tube 14 and ear tube 13.

Transmitter tube 13 is secured to a rigid plastic tube 43 which is curved to loop over the ear of the wearer. Tube 43 functionally is similar to mount 10, but it does not permit freedom of movement of the head as does the device of FIG. 1 unless the wearer also has a hat or helmet which covers the ear, thereby holding tube 43 against the head of the user. Tube 43 is connected to mouthpiece tube 16 by another sleeve 44. The frictional engagement of the sleeve 44 to tube 43 and mouthpiece tube 16 is such that rotational adjustment of the mouthpiece tube 16 is possible to suit the convenience of the user. FIG. 4 also shows a mouthpiece 45 frictionally engaged to rigid plastic mouthpiece tube 16 to help focus the sound of the user into mouthpiece tube 16.

I have found that the simpler device of FIG. 4 may conveniently be used for an intercom system between two riders of a motorcycle. Prior to this invention, motorcycle riders could communicate only with great difficulty, even though the riders are physically close together, because of the street noise and wind associated with motorcycle riding. Moreover, motorcycle riders wearing helmets find voice communication even more difficult because the helmet covers the ear. The device of FIG. 4 may be coupled using a coupling of the type shown in FIGS. 2 and 3. By using two headsets of the type shown in FIG. 4 with the receiver tube of one coupled to the transmitter tube of the other and vice versa, two way communication between motorcycle riders is possible. The helmet of the motorcycle wearer which covers the ear serves to hold tube 43 looped around the ear of the users so that they can conveniently communicate in spite of ambient noise. No electronics is necessary because no amplification is required so long as the headsets are not separated by more than eight feet of tubing. Beyond eight feet of separation, the clarity of voice communications diminishes gradually.

FIG. 5 shows still another embodiment of the invention in which the headset is mounted by the means of a headband 51. Headband 51 has at one end a hole through which a bolt 52 passes and is secured by nut 53. On one side of the headband 51, also secured by bolt 52, is a pad 54, made of polyurethane foam or other soft material to rest against the temple of the user. Headband 51 is constructed of plastic or other suitable material in a C-shape to provide light spring tension at the ends of the headband against the temples of the wearer. At the other side of the hole in one end of headband 51 is a strap 56 which is also secured to headband 51 by means of the bolt 52 and nut 53. Strap 56 encircles a rigid plastic tube 57 which serves as a connector for transmitter tube 12 and mouthpiece tube 16. Sleeve 44 engages tube 57 and mouthpiece tube 16 in the same manner as described with respect to FIG. 4 so that adjustment of mouthpiece 45 is permitted. Receiver tube 14 is connected to earpiece tube 13 by means of sleeve 42 in the same manner as described with respect to FIG. 4. At the other end of headband 51 is a corresponding pad 58 secured by any suitable means to the headband, such as by riveting.

The headband mounting illustrated in FIG. 5 is useful for those instances where post auricle mounting as in FIG. 1 is not desired. The device is exceedingly simple and low-cost to manufacture, and yet has the fidelity and clarity of the most sophisticated headset so long as tubes 12 and 14 are not exceedingly long. For example, where the headset of FIG. 5 is used in aircraft, tubes 12 and 14 rarely need to be more than two to three feet in length. In light planes, the ambient noise of the cockpit can preclude easy voice communication. With the device of FIG. 5, however, two such headsets can be coupled together in the manner described with respect to FIG. 4 and two occupants of the aircraft can readily communicate without need for amplification or electronics. Alternatively, the headset of FIG. 5 can be coupled to a console having microphone, amplification and receiver electronics components as described in connection with FIG. 2.

Relatively short tubes 12 and 14 provide highly satisfactory communications media for most applications. However, for certain applications, such as telephone operator's headsets, it is desirable to minimize interference with the acoustic transmission through tubes 12 and 14. For this purpose, specially extruded tubes may be used. FIG. 6 is a cross-sectional view of combined transmitter and receiver tubes which are acceptable for minimizing interference. The combined tube 61 has two identical conduits 62, and 63, either of which can be used for transmitting or receiving. The conduits are separated by web 64 which maintains constant separation between the transmitter and receiver tubes. This serves to minimize any feedback that might occur when the tubes are immediately contiguous as illustrated in FIG. 1. Also, FIG. 6 shows fins 66–69 which serve to keep the tube 61 out of contact with the user's clothing or equipment. In the absence of fins, the rubbing of conventional tubes 12 and 14 against the limbs or clothing of the user or against surfaces of nearby equipment can introduce noise levels which interfere with the transmission of voice communications. Ordinarily, four such fins 66–69 are adequate to keep conduits 62 and 63 sufficiently distant from clothing or equipment adjacent the station of the user. However, more fins or different configurations of tube 61 may be used as desired for manufacturing expedience. Also, if desired, protective sheaths may encompass tubes 12 and 14 to minimize external interference and noise caused by rubbing.

It is thus apparent that the headset of the present invention provides an inexpensive, virtually indestructible, all-acoustic and lightweight system to replace conventional headsets. The frequency response of the present headset matches or exceeds that of electronic headsets over short distances so that the headset may be conveniently plugged into electronics systems with no loss to the clarity of the voice communication. Two such headsets may be connected together to provide easy and inexpensive communication medium between motorcyclists, pilots, and others operating in a high noise environment.

The headset is the only one allowing transmission of voice communications which is adapted to fit under conventional helmets worn by motorcyclists and the like. Hertofore, motorcyclists have bolted a boom microphone to their helmets to permit radio transmission. The present headset requires no modification of helmets, yet permits easy transmission.

I claim:

1. A non-electrical, acoustical communications headset for use remote from communications equipment, said headset comprising:
   means for mounting the headset on the head of the user, a flexible transmitter tube supported by the mounting means having one end adjustably adapted for positioning near the user's mouth for conducting sound therefrom and the other end terminating in a coupling adapted to releasably connect to communications equipment remote from the user's head,
   a flexible receiver tube supported by the mounting means having one end positioned in the user's ear for conducting sound thereto and the other end terminating in a coupling adapted to releasably connect to communications equipment remote from the user's head, said communications equipment including amplifying means communicating with the receiver tube and a microphone communicating with the transmitter tube.

2. An acoustical communications headset as in claim 1 wherein the coupling means also contains a microphone, a receiver and electric circuit means to connect the microphone and receiver to a communications console.

3. A headset as in claim 1 wherein the means for mounting is a post auricle mount.

4. A headset as in claim 1 wherein the means for mounting is a headband.

5. A headset as in claim 1 wherein the remote communications equipment is an apparel mounted miniaturized transmitter and receiver.

6. A headset as in claim 1 wherein at least a portion of the length of the transmitter tube and the receiver tube are separated by a constant distance to avoid interference.

7. A headset as in claim 1 wherein the tubes are protected by a sheathing on the transmitter tube and/or the receiver tube to absorb noise caused by friction between the wearer of the headset and the tube.

8. A headset as in claim 1 wherein fins are attached to at least a portion of the length of the transmitter tube and/or the receiver tube to minimize the contact between the tube and surfaces of the wearer or associated equipment.

9. A headset as in claim 1 wherein the mounting means and the transmitter tube end positioned near the user's mouth are adapted to be used by the wearer of a conventional motorcycle helmet without modification of the helmet.

10. A non-electrical, acoustical communications headset for use with electronic communications equipment comprising:
   a. mounting means for supporting the headset on the head of the user,
   b. a rigid mouthpiece tube supported by the mouthing means,
   c. adjustment means for locating one end of the mouthpiece tube near the mouth of the user,
   d. a transmitter tube cooperating with the mouthpiece tube and adapted to releasably engage electronic communications equipment remote from the head of the user for acoustic transmission of voice communication from the mouthpiece tube to the communications equipment,
   e. an ear tube supported by the mouthing means and adapted to engage the ear of the user,
   f. a receiver tube cooperating with the ear tube and adapted to releasably engage electronic communications equipment remote from the head of the user for receiving acoustic transmissions of voice communications from the communications equipment to the ear tube.

11. A headset as in claim 10 wherein the mounting means is a post auricle mount.

* * * * *